Jan. 23, 1951 L. J. LAMBERT 2,539,309
MACHINE FOR CUTTING CONTOURS
Filed Aug. 8, 1945 6 Sheets-Sheet 5
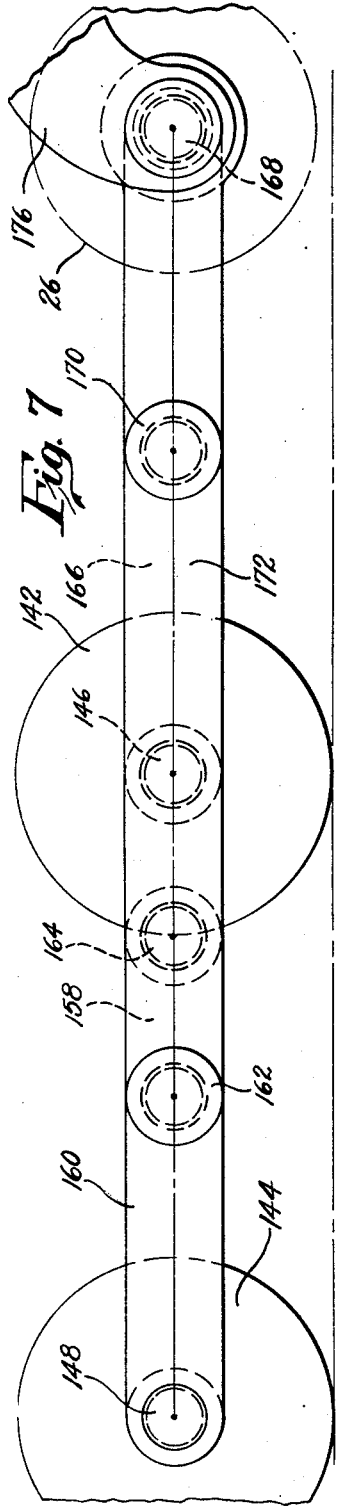
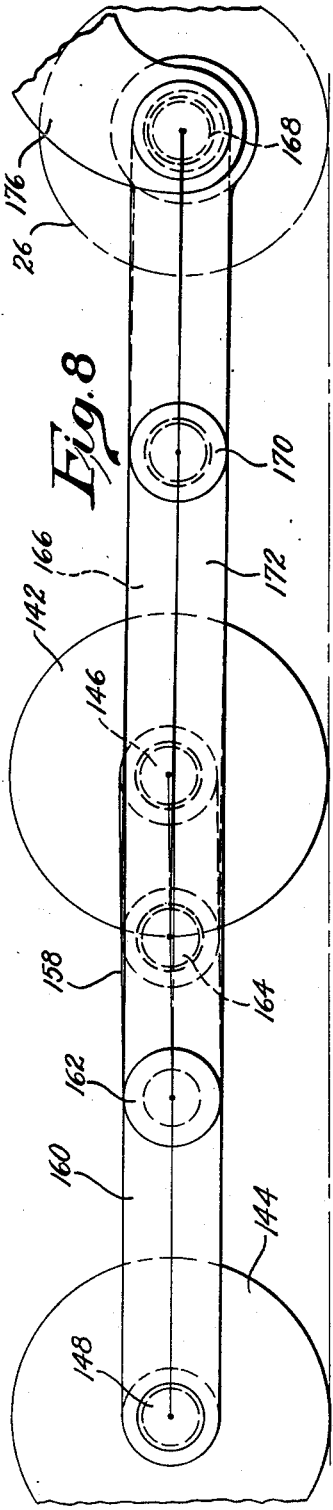
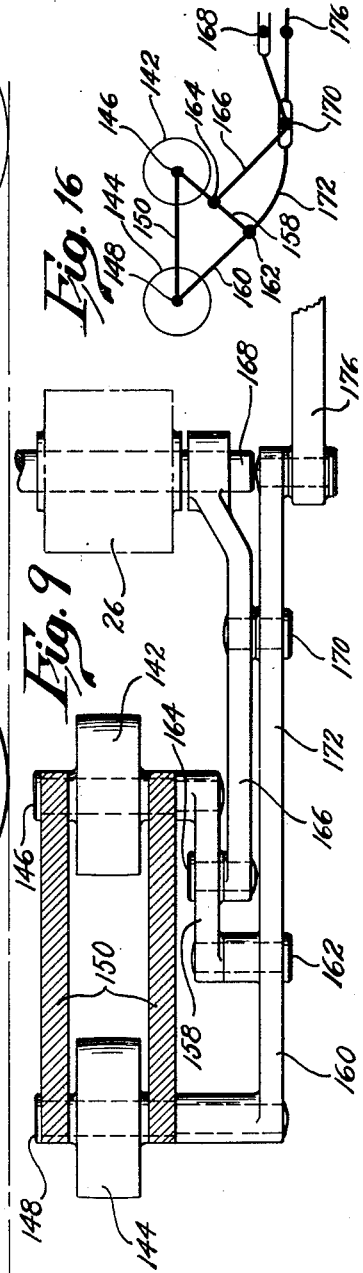
Inventor
Leo J. Lambert
by Attorneys

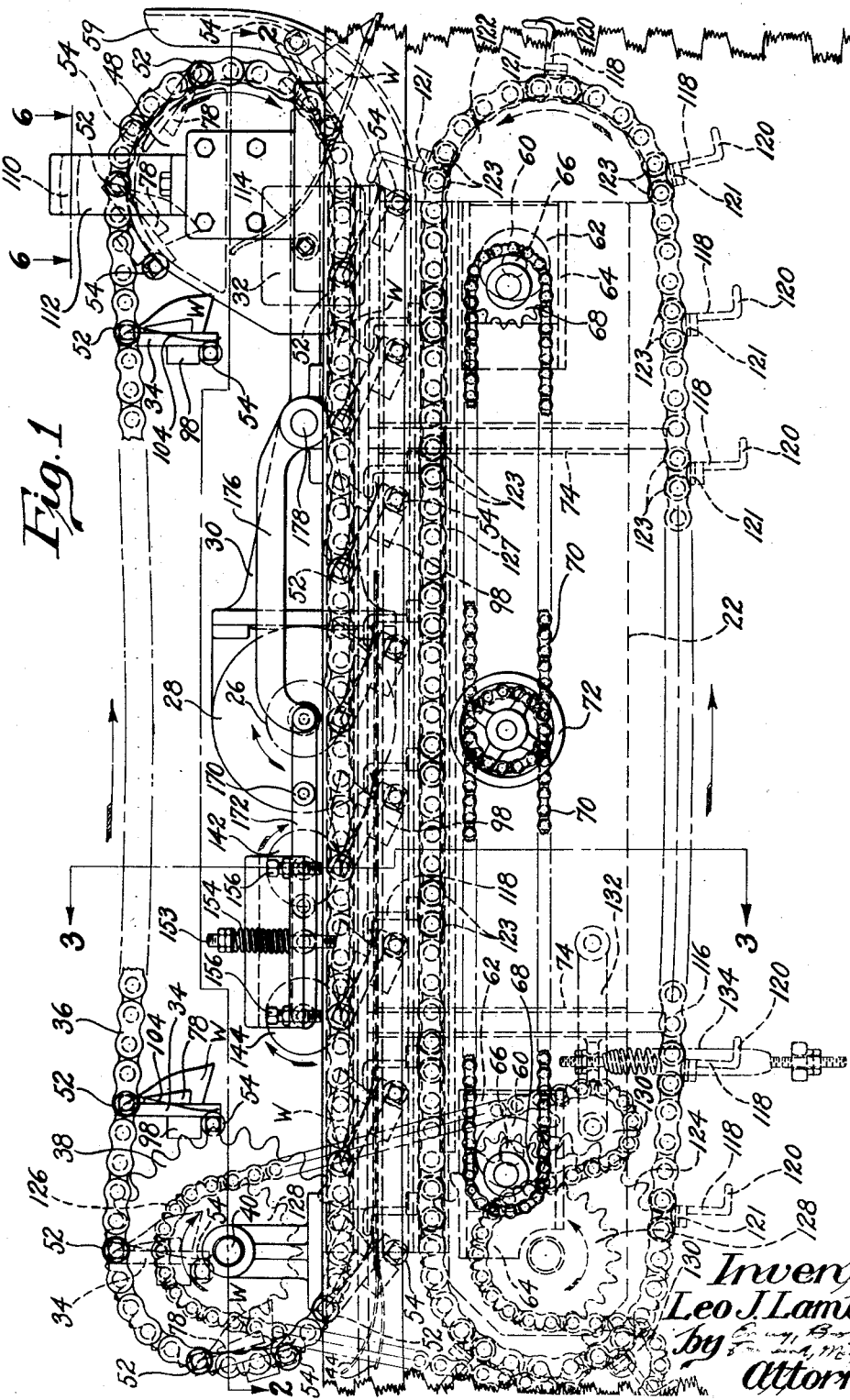

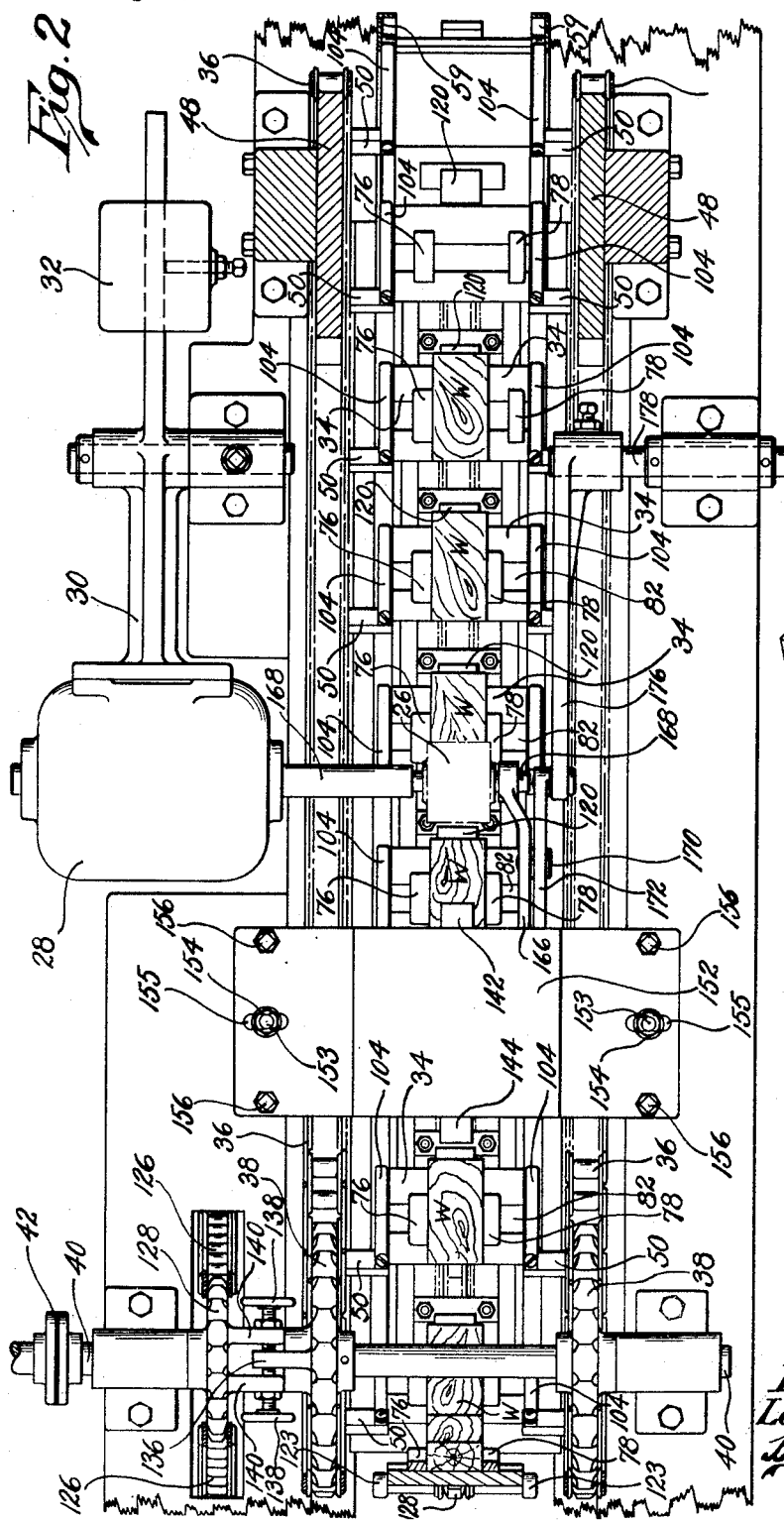

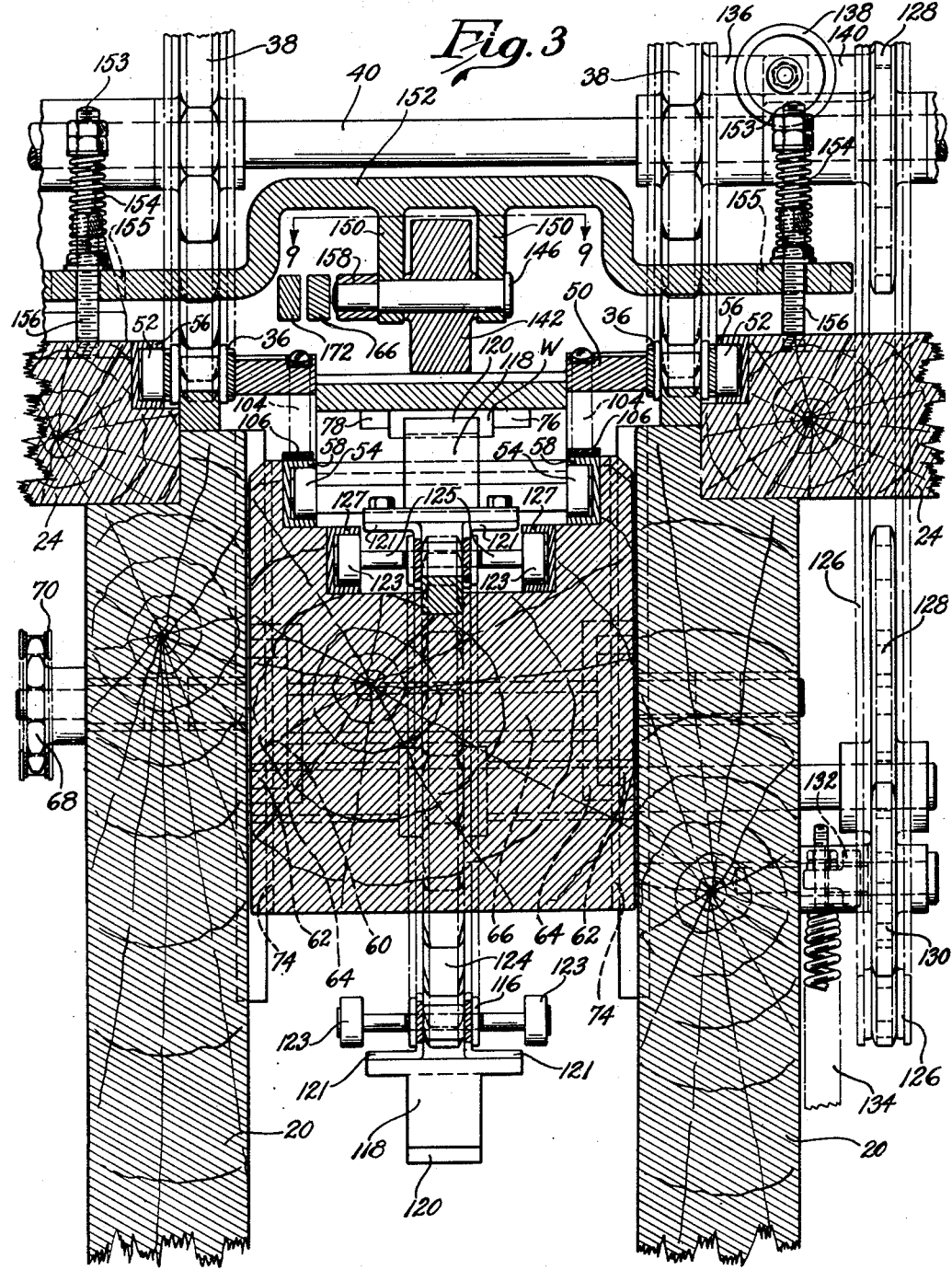

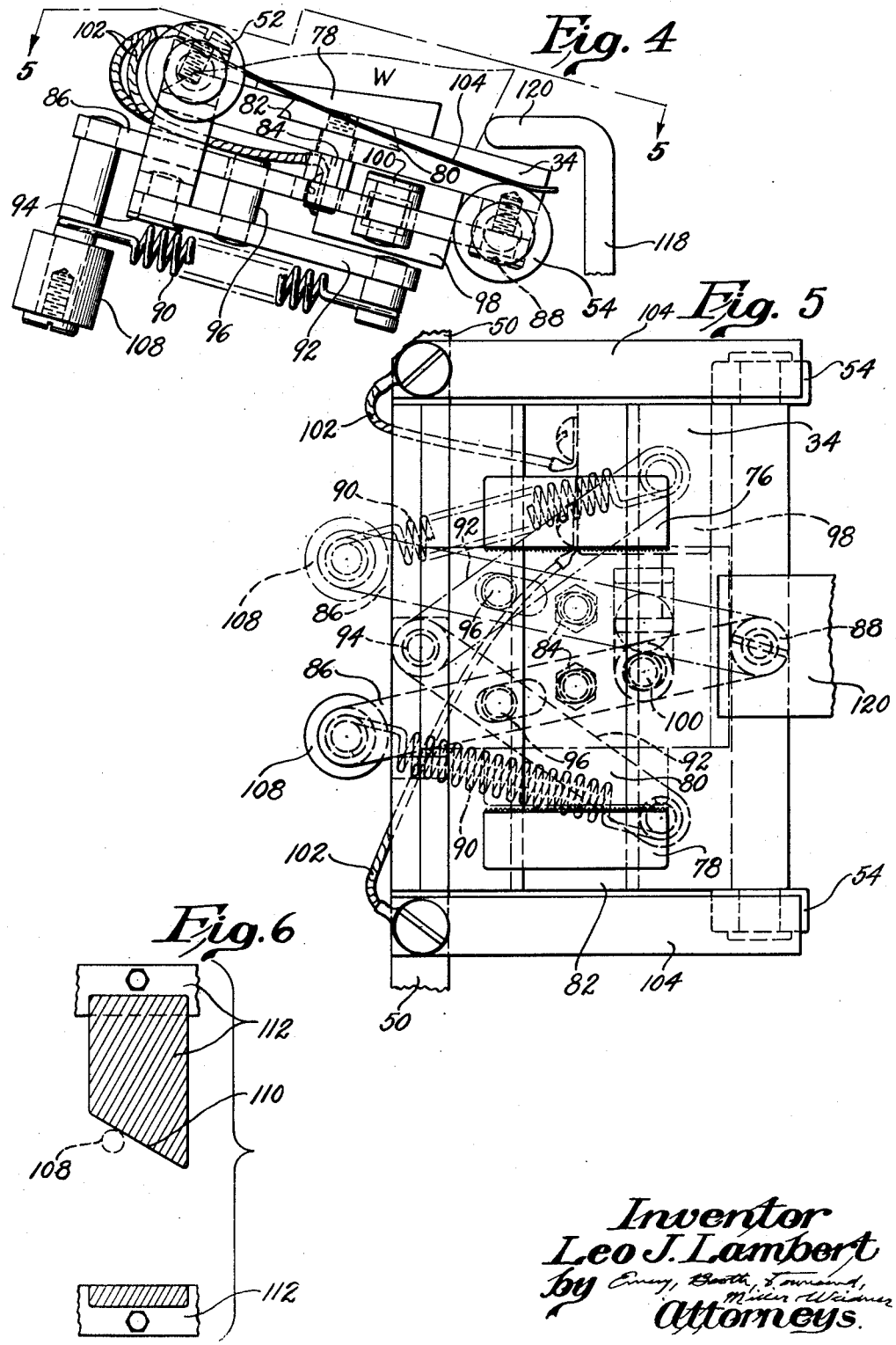

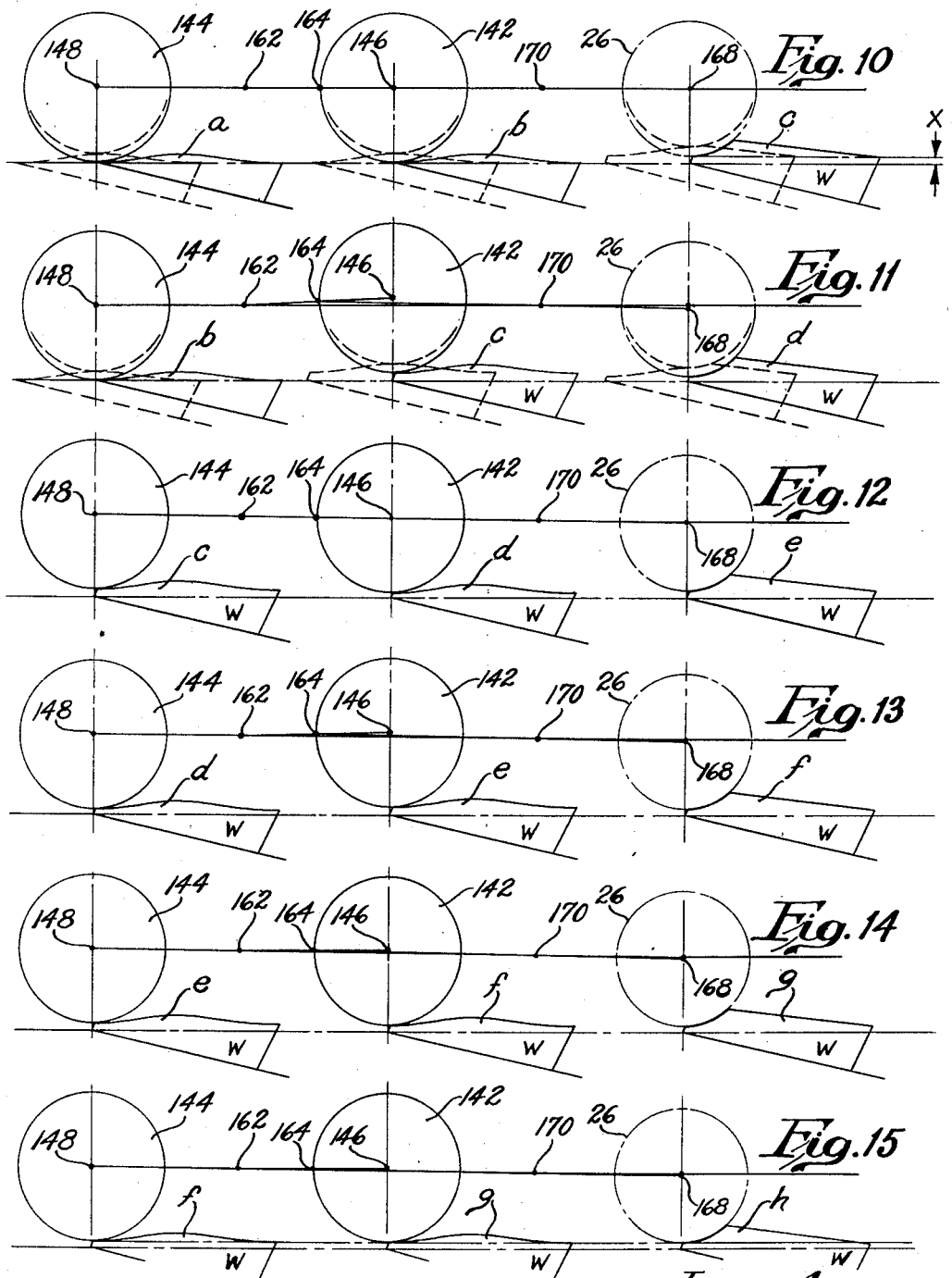

Patented Jan. 23, 1951

2,539,309

UNITED STATES PATENT OFFICE 2,539,309

MACHINE FOR CUTTING CONTOURS

Leo J. Lambert, Danvers, Mass.

Application August 8, 1945, Serial No. 609,518

18 Claims. (Cl. 144—144)

This invention relates to a machine which will successively cut repeats of a curvilinear contour and as a specific example thereof a machine which will operate on successive separate blanks or work pieces to form each with a similar contour. One large field for the use of such a machine is in the manufacture of wooden heels for women's shoes, and I shall herein illustrate and describe as an exemplary embodiment of the invention a machine particularly designed for use in the manufacture of wedge heels, so called, and operating to cut from suitable blanks or blocks the surface which in use opposes the heel seat portion and arch of the shoe.

The machine which I am about to describe bears a certain resemblance to known machines wherein relative movement between a work piece and a cutter head is controlled by a template or cam to cause the cutting of a desired contour on the work piece or wherein the cutter head is guided by a tracer cooperating with a master pattern. An important feature of the invention, however, radically distinguishing it from such machines is that the contours as formed by the machine are utilized, as on one block or blank, to control the cutting operation for a subsequent repeat of the pattern, as on a succeeding block or blank. I believe such arrangement to be fundamentally novel and it has many advantages which will appear to those skilled in the art as the description proceeds and certain of which will be adverted to herein. A coordinate object of the invention is the provision in a contour cutting machine of an improved construction for handling the several work pieces during their passage through the machine to provide ease of operation, accuracy and speed.

My invention will be well understood by reference to the following description of the specific embodiment thereof shown by way of example in the accompanying drawings, wherein:

Fig. 1 is a side elevation as seen from the operator's side, certain frame members (illustrated in Fig. 3) being broken away between their ends or being omitted and having their position indicated by dash lines in order to disclose parts which lie behind them or at the further side of the machine;

Fig. 2 is a plan view looking downwardly from the line 2—2 of Fig. 1;

Fig. 2a is a perspective of a blank or block for a wedge heel having indicated thereon in dot and dash lines a contour to which it may be cut;

Fig. 3 is a section on an enlarged scale on the line 3—3 of Fig. 1;

Fig. 4 is a side elevation of the work-carrying table with its work-clamping mechanism;

Fig. 5 is a plan of the same looking in the direction of the line 5—5 of Fig. 4;

Fig. 6 is a section on an enlarged scale on the line 6—6 of Fig. 1;

Fig. 7 is a side elevation on an enlarged scale illustrating certain tracer rolls and the cutter head controlled thereby and the connecting means therefor;

Fig. 8 is a similar view showing the same parts in another position;

Fig. 9 is a section on the line 9—9 of Fig. 3 and shows in plan on a smaller scale the parts which appear in Figs. 7 and 8;

Figs. 10 through 15 are diagrammatic views showing various positions assumed by the parts shown in Figs. 7 and 8 during a typical series of initial cutting operations by the machine; and Fig. 16 is a diagram, unrealistic as regards the actual construction of the machine shown in the other figures but here included to facilitate the understanding of the combination of parts more particularly illustrated in Figs. 7 through 9.

As I have already stated, the machine here shown is adapted to cut from suitable blanks or work pieces w (Fig. 2a) the surface which in a wedge heel opposes the heel and extends under the arch of the shoe. In Fig. 2a this blank is shown as a somewhat tapered block of soft wood with parallel sides as we may assume in the present instance that the "turning" to provide the side surface of the heel is a second operation although the order of operations might be reversed. The machine operates to cut away from this block the portion thereof which lies above the dot and dash line in Fig. 2a, the remaining portion when turned to the proper side outline constituting the wedge heel.

Before proceeding with the detailed description it will be convenient to state that the machine here shown is organized on a suitable frame which may be constructed of wood, as indicated in Fig. 3, and may comprise two longitudinal frame members 20 which suspend between them a central member 22, desirably adjustable vertically for reasons later to be described and by mechanism which will be later described. This member is indicated in dash outline only in Fig. 1. Along the upper sides of the frames 20 are the longitudinal members 24 located at either side of the machine and providing a support for various pillar blocks and other mechanical elements, as will be apparent from inspection of the drawings as the mechanical details of the machine are hereinafter described.

The cutting is effected by a rotary cutter head 26, here conventionally illustrated merely as a cylinder. It may be of the type usual in shapers and comprise a number of removable knives having either straight or profiled cutting edges as required by the work at hand. The circular boundary of the cylinder represents the cutting circle of the knife edges. The cutter lies substantially centrally of the machine and is here shown as mounted on the shaft of an electric motor 28 carried by a pivoted arm 30 and counterbalanced by a weight 32 in such manner that merely enough pressure is provided to hold the cutter up to its work. The vertical position, viewing Fig. 1, of the cutter head is varied by control means hereinafter described to cause it to cut the desired contour on work pieces passing beneath the same and which travel from right to left, viewing Figs. 1 and 2.

The work pieces or blanks w are secured to tables 34 which are traversed successively past the cutter head. Herein they are moved by a chain conveyor comprising sprocket chains 36 at either side of the machine, the chains having straight runs, herein their lower runs, passing the under side of cutter head 26, as best shown in Fig. 1. The cutter head thus opposes the lower run of the chain from the inner side thereof, the upper run of the chain extending above the same. The chains are driven by sprockets 38 on the transverse shaft 40 connected through coupling 42 (Fig. 2) to a suitable source of power. Preferably the right-hand ends of the chains, viewing Figs. 1 and 2, are not trained over sprockets but over fixed semi-cylindrical guides 46 located generally where a companion sprocket wheel would ordinarily be mounted. This construction aids in preventing jerking and chattering of the chains and regularizes the motion as they are drawn forward by the sprockets.

The tables 34 are carried by the chains onto supporting guides which position them relatively to the cutter head during the cutting operation. Herein the tables are hung pivotally from the chains by trunnion-like extensions 50 (Fig. 3) at one edge of the same and, except when positioned by the guiding means, may hang down freely as indicated at the upper portion of Fig. 1. The outer ends of the extensions 50 are provided with a pair of rolls or wheels 52 and a pair of wheels 54 is provided at the other end of the table. As best seen in Fig. 3, the wheels 52 may run in a guide or track-way formed by milled-out channels 56 along the opposed inner edges of the longitudinals 24 while the wheels 54 run in similar track-ways 58 on central member 22. As seen at the right of Fig. 1, the web and lower flange of channel 58 may be extended at 59 adjacent the chain guides 48 and shaped to swing the tables into proper position to cause the wheels 54 to enter their guideways. The tables are thus rigidly supported as they pass the cutter head and in the present instance because of the different elevation of the tracks are disposed at an angle so that the line of cut on the blank, as indicated by the dot and dash line in Fig. 2a, is approximately horizontal, thereby minimizing the necessary movement of the cutter head in making the cut.

To provide for producing heels of different heights the angle of the tables may be varied by adjusting the elevation of the central member 22 and with it the track-ways 58 and herein (see Figs. 1 and 3) eccentrics 60 are provided at both ends of the machine at each side of the central frame member 22, the eccentrics working in eccentric blocks 62 sliding horizontally in channel guides 64 and being connected pairwise for simultaneous rotation at each end of the central member by the cross-member 66 which passes through the central frame with a suitable clearance. The operating shafts of the eccentrics extend through the side frames 20 and are fitted with sprockets 68 and the two sprockets 68 at the ends of the machine may be turned by means of the sprocket chains 70 from a single central hand wheel 72. When the wheel 72 is turned, the central member is moved vertically along the vertical guideways 74 provided therefor.

The work pieces w are clamped to the faces of the tables 34. A preferred construction for these clamps is illustrated in detail in Figs. 4 and 5. As there shown they include a fixed jaw 76 for engaging one side of the work piece w and an opposed jaw 78 slidable transversely of the table by means of the dovetailed base 80 thereof which moves in a suitable undercut way 82 on the top of the table. The jaw 78 may be moved along the way by means of a stud 84 which projects downwardly from the dovetail 80 and passes, with suitable clearance as seen in Fig. 4, through the table. The stud 84 is connected beneath the table to the intermediate portion of a forwardly extending lever 86 pivoted at 88 at the central rear portion of the table and having its forward end connected by a spring 90 to the free end of a lever 92 pivoted on fixed center 94 at the forward end of the table, the two levers being connected between their ends by a pin and slot connection 96 which permits the movements hereinafter described. In the full line position of the lever 86, as seen at the lower portion of Fig. 5, the movable jaw 78 is withdrawn from fixed jaw 76 and the work piece can be freely placed between the same. Now, if the free end of the lever 86 is thrown upwardly, viewing Fig. 5, to the dot and dash position illustrated, the movable jaw is likewise drawn upwardly to clamp the work and in this movement the connection at 96 moves over center and the parts remain in that position under the tension of the spring 90. As will appear, however, this mechanical pressure of the jaws is not alone relied upon in the present machine for firmly securing the block during the actual cutting operation.

Herein for closing the jaws and holding them closed I utilize an electrically energized mechanism which may consist of a solenoid 98, the movable core of which is connected to a pin 100 on the lever 86 so that when the solenoid is energized it will draw the pin 100 upwardly, viewing Fig. 5, closing the movable jaw 78 and, as long as its energization continues, hold it in firm clamping relation to an interposed work piece.

To control the energization of the solenoid, leads 102 from its winding (Fig. 4) may be connected to brushes 104 in the form of flexible springs mounted on, but insulated from, the trunnion-like extensions 50 at the front of the table (see Fig. 3) and which, when the carriage is free from the supporting track-ways, may rest against the rear wheels 54 of the tables as shown in Fig. 4. As the tables are rolled into cooperation with the track-ways, these brushes are flexed upwardly and then move along contact strips 106 disposed along the upper margins of the central frame member 22 immediately above the location of the tracks 56 and which are connected to opposite sides of an electric line by connections 44. The solenoid is thus energized to close the clamping device and to hold it closed during the operation of the cutter head but is deenergized when the brushes leave the contact as the table is carried upwardly around the sprocket 38 to start its return journey toward the right, as shown at the upper portion of Fig. 1. Desirably, however, the clamps remain closed under the action of the spring 90 until the tables again come to the right-hand end of the machine. The tables with the completed heels thus travel from the left-hand end of the machine to the right-hand end, viewing Fig. 1, hanging from the upper run of the conveyor with the completed work in full view of the operator for inspection as seen in that figure. At the right-hand end of the machine the roller 108 mounted on one end of the lever 86 (see Fig. 4) may be operated on by the diagonally disposed cam surface 110 (see Fig. 6) carried by the yoke 112 adjacent the right-hand end of the chain conveyor, which throws the lever from the dot and dash position of Fig. 5 across center to the full line position, opening the clamp and permitting the finished work to drop under gravity to the discharge chute 114.

Properly to position the work piece on the table 34 a stop or gage for its rear end is required and herein rear gages for the various tables are provided with a common mounting and provision for simultaneous adjustment. For this purpose a chain 116 is provided centrally of the machine with its upper run adjacent to and parallel to the lower run of the table-carrying conveyor, which chain carries back stop members 118. These back stop members are mounted on outwardly turned flanges 121 which are parts of the chain links and each is supported in the upper run of its travel by two pairs of rollers 123 on the extended ends of the chain pivot pins 125, which rollers roll into tracks 127, the construction being analogous to that of the tables 34 and their supporting rolls moving on tracks 56 and 58. The back stop members 118 have projecting nose portions 120 which, when the adjacent runs of the chain 116 and conveyor chains 36 roll into opposed relation, extend in over the rear edges of the tables 34 in the manner perhaps best seen in Fig. 4 to provide gages cooperating with the back ends of the work pieces to locate them in proper position on the tables to be grasped and held in that position by the jaws 76 and 78 already described. The lower chain is dragged around a fixed guide 122 at the right-hand end of Fig. 1 and into tracks 127 by the driving sprocket 124 at the left-hand end, the shaft of the sprocket being driven from the shaft 40 of the sprockets 38 of the upper chain conveyor by chain 126 trained about suitable connecting sprockets 128 on said shafts and binder sprockets 130, one of which is mounted on swinging arm 132, normally drawn to chain-tightening position by a spring 134. To provide for adjusting the timing of the two chain conveyors and thereby simultaneously adjusting the positions of the back stops or gages 120 relative to the tables 34, the driving sprocket 128 for the chain 126 is secured to the driving shaft 40 of the upper conveyor through (see Fig. 2) the driving arm 136 on sprocket 38 which enters between the ends of two hand screws 138 on two arms 140 projecting from sprocket 128. By backing out one of these screws and turning up the other the position of the driving sprocket 124 is altered relatively to that of sprocket 38 and a simultaneous adjusting movement of the various back stops carried by the lower chain conveyor 116 is effected.

The construction as so far described is an example of a suitable mechanism for moving successive blocks or blanks at regular intervals past the cutter head 26. The general principle of operation of the cutting mechanism of the machine is that a block which has been shaped by the cutter head after passing the same is used as a template or pattern for control of the cutter head in a subsequent contouring operation.

Referring now more particularly to Fig. 1, herein two tracer wheels or rolls 142 and 144, which, for reasons in connection with the particular mechanical design which will appear, are herein of the same diameter as the nominal maximum cutting circle of the cutter head 26, are mounted on transverse shafts or centers 146 and 148 spaced from one another and from the cutter head in such manner that pieces of finished work on two successive tables enter and pass beneath the rolls as a blank enters and passes beneath the cutter head. It will be apparent that if the cutting circle of the head were of exactly the same size as the rolls, a movement of the center of the former vertically equal in amount to the movement of the center of the latter would cause the cutter to duplicate the previous piece. If, however, for one reason or another the piece passing beneath the tracer roll were cut slightly over or under size, although the error in itself might be within an acceptable tolerance, it would in such case be cumulative and soon become prohibitive. The construction which I am about to describe avoids this difficulty and provides other advantages in use.

The shafts or centers 146 and 148 for the tracer wheels are (see Fig. 3) journalled in depending webs 150 from a cross-member 152 guided centrally on posts 153 projecting upwardly from the side members 24 and capable of being displaced upwardly against the pressure of the springs 154 carried by those studs. The two tracer rolls 142 and 144 thus move vertically in unison in the plane of the paper, viewing Fig. 1, or may swing one relatively to the other in that plane. The posts 153 are here shown as received by transversely elongated slots 155 in member 152 to permit transverse adjustment of the latter to cause the rolls to track centrally on work of different widths. Downward descent of the rolls is limited by stop screws 156 through the corners of member 152 and they thus cannot foul the tables. Since, as will hereafter appear, the cutter head is sustained at substantially the same level as the rolls, this arrangement also prevents the cutter head from coming into contact with the tables.

To control the position of the cutter head 26 by means of the tracer rolls 142 and 144 I utilize a linkage which compensates for errors and in the course of a few cutting operations will automatically relatively position the cutter head, irrespective of its exact diameter, tangent to the common tangent to the rolls 142 and 144, as illustrated in Fig. 8, so that if the two tracers cooperate with identical pieces and the cutter head moves vertically with them, the cutter head will form an exact duplicate of those pieces. This linkage possesses the property that under simultaneous parallel movement of the tracers the parts of the linkage move in unison as if parts of a rigid body but shift relatively on swinging movement of one tracer relative to the other. Thus if a relatively over-size work piece passes one of the rolls, it can swing relatively to its companion roll, and this motion is imparted in some proportion to the cutter head to effect an adjustment of the latter in the opposite sense. Eventually the cutting circle of the cutter head will be brought to the desired position and the machine will proceed without compensating movement of the linkage. Thus, referring, for instance, to Fig. 7 in which the cutter head and the tracer rolls are in what might be termed zero position but the cutter head is under-sized (exaggerated in the figure as compared to what would occur in practice), the piece of work would be cut over-sized by the cutter head, but after a few cutting operations the parts would be brought in a manner to be described to the adjusted position shown in Fig. 8. The movements involved are very small and have been exaggerated not only in Fig. 8 but in the diagrams, Figs. 10 through 15, which will hereinafter be referred to.

In the normal zero position of the linkage, as shown in Fig. 7, the various links are aligned and in general they remain substantially aligned. I believe, however, the construction and operation will be more readily understood by reference first to the diagram, Fig. 16, in which the various links are shown separated to form a linkage of similar operation to that in fact shown as a portion of the machine and the action of which, because of its more open character can be more easily seen. Referring, therefore, to Fig. 16, I there show the centers 146 and 148 of the two tracer rolls 142 and 144 fixedly connected and spaced by the part 150 which is represented in the actual construction by the webs 150 of the frame in which the rolls are mounted. The centers 146 and 148 are connected by two links 158 and 160 respectively pivoted together at 162. The links 150, 158 and 160 form an indeformable triangle. At center 164 between the centers of the link 158 is pivoted lever 166, the opposite end of which engages a center 168 on the end of the cutter head shaft while at an intermediate point 170 the lever 166 is operatively joined to an extension 172 of link 160 past the center 162, this connection being a pivotal one with provision for slight longitudinal play graphically shown with exaggeration in Fig. 16 as an elongated slot 174 in the link extension 172.

Now, referring to Fig. 16, if the two rolls move vertically, the linkage remains rigid and the center 168 moves vertically an equal amount. If, however, roll 142 is raised by an unduly large piece passing beneath the same so that it will swing about center 148, the point 164 will move upwardly with it tending to rock lever 166 on center 170 and depress the cutter head shaft at the point 168. Also if the rear roll 144 swings upwardly about 146 as center, the link 160 and its extension 172 will be moved therewith, likewise tending to depress center 168. The extent of the motion will depend on the proportioning of the parts and, of course, motions of both rolls may occur simultaneously and in varying amounts.

In the actual construction of the machine as illustrated in the other figures of the drawings, we may consider that the triangle formed in Fig. 16 by the parts 150, 158 and 160 has decreased in altitude until the latter two parts are in line with the line of the centers 146 and 148 and the other levers also extend in that line in the zero position of the parts shown in Fig. 7. The actions of the parts are the same. The same numerals as are found on Fig. 16 are applied to the parts in the other figures. In Fig. 16 I have shown the connection to the center 168 as made by means of a fork and the center 170 as working in a slot 174 in the extended end 172 of lever 166. When the parts are aligned as shown, the motion of the various parts is so small in practice that the necessary freedom may be provided merely by a running fit in the joints at these points and the fork and slot therefore do not appear in such realistic figures as 7, 8 and 9, nor have I attempted to illustrate any play in these joints.

Referring particularly to Figs. 1, 2 and 9, the extension 172 of the lever is shown continued past point 170 and, preferably in line with the shaft of the cutter head 26, is supported by a radius link 176 which may desirably be pivoted at 178 in line with the pivot of the arm 30, about which center the cutter head swings.

The operation will be understood from Figs. 10 through 15. In Fig. 10 we see the centers 148 and 146 of the two tracer rolls and the center 168 of the cutter head horizontally aligned. The cutting circle of the cutter head, as will be discussed later, is somewhat smaller in diameter than the rolls so that it would cut a distance $x$ as shown at the right of the figure above the common tangent to the rolls. This distance is exaggerated in Fig. 10 and in practice would be a few thousandths of an inch.

Now by way of example we may assume that a run of work is required which duplicates a previous order from which two identical samples $a$ and $b$ are available. These are placed on two of the tables 34 of the machine and blanks, as illustrated in Fig. 2a, on the succeeding tables and the cutter head is held up out of operation until the samples $a$ and $b$ approach the tracer rolls 142 and 144 respectively. Now, viewing Fig. 10, as the convex portion of the samples $a$ and $b$ moves from the full line position to the dotted line position shown, the three centers of the rolls and the cutter head move upwardly in unison to the dotted line position indicated and the work piece $c$ will be cut somewhat over-size although not enough to spoil it for practical use. If, however, the centers always moved in unison in this manner, this error would be cumulative, as already pointed out. Now, referring to Fig. 11, when the over-sized piece $c$ reaches roll 142, it will swing its center 146 upwardly, depressing center 168 and causing a deeper cut to be taken on the block $d$ than was taken on block $c$. The parts then move to the position of Fig. 12, center 148 is raised and center 146 also but not so much with corresponding depression of the center of the cutter at 168, and this proceeds until the parts have, so to speak, found a common level, as indicated in Fig. 15 wherein there is a common tangent to the rolls 144 and 142 and to the actual cutting circle of the cutter head 26, this being positioned above the zero line indicated in Fig. 10 a distance between zero to one half the initial under-size of the cutter head. The rolls and cutter head will thereafter move parallel and vertically as the former are displaced by identical pieces $g$ and $h$, and the cutter head will form the next succeeding piece to the identical contour. When the cutter head is resharpened, its cutting circle may be altered, but the machine quickly adapts its action to the change in the manner described.

Where original samples are not available, new ones may readily be made, either by a slight alteration of different samples on hand or new ones can be readily and quickly formed from soft wood. No durability is required as in the case of a cam or master pattern which might be required to control thousands of operations. As soon as the product begins to come off the machine, two pieces may be utilized to start another similar machine in operation on the same work. The samples are cheap, easily stored and easily altered. Moreover, an important feature of the machine is that by starting with two markedly dissimilarly contoured blocks in one order or another, as $a$ and $b$, or by positioning a leading block on its table through suitable shims to alter the relation of its contoured face to the tracer rolls, a product may be cut different from either and in a short time a variety of blocks of different contours may be produced to serve as patterns for later duplication or as approximations readily altered by hand to provide patterns for a particular order.

In the description reference has been made to the cutting circle of the cutter head being of smaller diameter than that of the rollers. It would not be possible in practice for a mechanic to comply with a requirement that the cutting knives cut a circle of exactly the same size as the rollers. If its diameter were only .002 smaller than the rollers and the guiding movement of the system were limited to a vertical parallel movement of the roller centers and the cutter center, each successive piece of work would be .001 of an inch higher, and if 1000 pieces were permitted to traverse the machine the error would mount to an inch. If the cutter were slightly too large, the finished work pieces would be progressively thinner. In accordance with my invention the mechanic may be told to grind the cutter with a tolerance of between —.002 and —.008, which he can readily do. If we suppose that he grinds the cutter .006 under-size, one-half of this, or .003, represents the distance shown at $x$ in Fig. 10 of the drawings and there greatly exaggerated. The work piece marked $c$ would thus be .003 too high in Fig. 11, an error which would be negligible in itself in the case of a shoe heel. For such purposes no blocks whatever are wasted. The machine runs on in the manner described and the cutting circle soon automatically finds a common level with the under side of the rollers 142 and 144 in a final relationship, as shown in Fig. 15, wherein the successive pieces will be exact duplicates and the three centers will vibrate vertically in parallel planes.

I have described the tracer rolls 142 and 144 as equal in diameter to the nominal diameter of the cutter head and the various links lying substantially along the common center line. Mechanically it will be seen that the rolls might be considered as vertical arms of a length equal to their radius depending vertically from centers 146 and 148 and having provision at their ends for rolling contact on the contoured pieces to facilitate their movement thereover. Also the actual rotating center of the cutter head might be definitely spaced vertically from the point 168. If the links were so formed that point 168 was out of alignment with centers 146 and 148, the movements of the linkage would be similar although different in amount.

The spacings of the repeat of the contour along the stock will correspond to the distances between the cutter head and the tracer rolls and that between those rolls, which distances should be equal to or a multiple of the repeat spacing. In the example where each repeat is on a separate work piece carried by an individual table the spacing of the work pieces on the tables as determined by the gages 120, which are definitely spaced one from another although variably positionable with respect to the table surfaces, corresponds to that of the cutter head from the rolls. The contour of each repeat may be anything within the capacity of a shaper cutter in the distances involved.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A machine for producing contoured articles comprising a floating cutter head, means for advancing a series of work blanks linearly beneath the cutter head and beyond the same, means connected to the cutter head for variably positioning the same to cause it to cut a desired contour including a tracer which tracer is positioned beyond the cutter head and in the path of a piece of work which has been operated on by the cutter head and has moved past the same to cooperate with said completed work piece for displacement by the same to control the position of the cutter head for operation on a succeeding work piece.

2. A machine for producing contoured articles comprising a floating rotary cutter head, means for advancing a series of work blanks linearly beneath the cutter head and beyond the same, two successive tracer wheels positioned beyond the cutter head and in the path of the pieces of work which have been operated on by the cutter head and relatively positioned to roll respectively on the contoured faces of separate successive pieces which have passed the cutter head as they continue their advance and means connected to the cutter head controlled by the joint action of said wheels for variably positioning the cutter head and effective to bring and maintain its cutting circle to tangency with the common tangent to said wheels.

3. A machine for forming successive repeats of a contour comprising a floating cutter head, means for forwarding a stream of successive pieces of work material beneath and beyond the same and means connected to the cutter head and having an actuating portion located in the path of contoured material which has passed the cutter head as it continues its advance for control by such contoured material to position the cutter head relatively to the material presented in opposition thereto to define the operative position of the head.

4. A machine for forming successive repeats of a contour comprising a floating cutter head, means for forwarding a stream of successive pieces of work material beneath and beyond same and means connected to the cutter head and having actuating portions located in the path of the contours which have passed the cutter head for cooperation respectively with separate ones of said contours which have passed the cutter head and are continuing their advance in the stream for jointly and differentially positioning the cutter head relatively to the material presented in opposition thereto to define the operative position of the head.

5. A machine for producing contoured articles comprising a floating cutter head, means for advancing a series of work blanks linearly beneath and beyond the cutter head, tracers positioned beyond the cutter head to make contact simultaneously with a pair of contoured articles which have passed the cutter head as they continue their advance for displacement individually thereby, and means connecting the tracers to the cutter head operating in response to a simultaneous displacement of the tracers to move the cutter head in the same sense and in response to a displacement of one tracer relative to the other to move the cutter head in the opposite sense.

6. Mechanism for variably positioning a cutting tool to cause it to cut a contoured surface comprising a pair of tracers which traverse respectively separate patterns and a linkage connecting the tracers and tool for effecting movements of the tool consequent on displacements of the tracers by said pattern, the parts of said linkage moving in unison on simultaneous parallel movement of the tracers and shifting on relative movement of the tracers.

7. A mechanism for controlling a part through two pattern pieces comprising a pair of tracer rolls on fixedly spaced centers capable of simultaneous parallel movement and relative swinging movements in a plane, links connecting said centers and pivotally joined, a lever pivoted to one link between its center and the joint and operatively pivotally connected between its ends to an extension of the other link beyond the joint, the other end of the lever being operatively connected to the controlled part for positioning the same.

8. A machine for forming successive repeats of a contour comprising a floating cutter head, means for forwarding a stream of work material beneath the same, a pair of tracer rolls in the wake of the cutter head on centers spaced from the cutter head and from each other to correspond with the recurrences of the contour, said centers being capable of simultaneous parallel movement and relative swinging movement in a plane to follow contoured work passing beneath the same, links connecting the centers and pivotally joined, a lever pivoted to one link between its center and the joint and operatively pivotally connected between its ends to an extension of the other link beyond the joint, the other end of the lever being operatively connected to the head to move the same.

9. A machine for contouring articles comprising a floating cutter head, a circulating conveyor having a run moving beneath the cutter head, a series of tables carried by the conveyor having gripping means for securing blank work pieces thereon, supporting means for the tables adjacent the cutter head along which they are moved by the conveyor, a pair of tracer rolls in the wake of the cutter head on centers spaced therefrom and from each other to correspond with the spacing of the work pieces on the tables, said centers being capable of simultaneous parallel movement and relative swinging movement in a plane to follow contoured articles coming from the head, links connecting the centers and pivotally joined, a lever pivoted to one link between its center and the joint and operatively pivotally connected between its ends to an extension of the other link beyond the joint, the other end of the lever being operatively connected to the head to move the same.

10. A machine for contouring work pieces comprising a chain conveyor, a cutter opposing a run thereof, tables pivotally mounted on the conveyor, each having gripping means for securing a work piece thereon, front and rear wheels on each table at either side thereof and track-ways in the vicinity of the cutter located respectively in planes at different distances from the cutter on which said front and rear wheels respectively run to position the tables during the cutting operation.

11. A machine for contouring work pieces comprising a chain conveyor, a cutter opposing a run thereof, tables pivotally mounted on the conveyor, each having gripping means for securing a work piece thereon, front and rear wheels on each table at either side thereof and track-ways in the vicinity of the cutter on which said front and rear wheels respectively run to position the tables during the cutting operation, the track-ways for one pair of wheels being adjustable in a direction transverse to the length of the run to determine the angle at which the table is disposed as it passes the cutter.

12. A machine for contouring work pieces comprising a chain conveyor, a cutter opposing the lower run thereof, tables mounted on the conveyor, each having a mechanical gripping device for securing a work piece thereon having a normally closed work-retaining position, means for additionally holding the device closed during traverse of the table past the cutter, and means for operating on the gripping device to open the same to discharge the work therefrom as the gripping device moves adjacent to the same, said means being located remote from the position of the cutter adjacent the feeding-in end of the machine at the upper run of the conveyor to provide an extended travel of the table between the cutter and the said means permitting inspection of the contoured piece.

13. A machine for contouring work pieces comprising a cutter, a work-supporting table, runways along which the table is moved past the cutter head, a clamping device on the table for securing the work piece, electrically energized means on the table for holding the device closed, brushes moving therewith and contact strips adjacent the path of the tables on which said brushes run during the cutting operation to energize said means.

14. A machine for contouring work pieces comprising a cutter, a work supporting table, runways along which the table is moved past the cutter head, a mechanical clamping device on the table having a normally self-maintaining closed position for securing the work piece, electrically energized means on the table for holding the device closed, brushes moving therewith and contact strips adjacent the path of the tables on which said brushes run during the cutting operation to energize said means, and means for opening the device located remote from the cutter and said strips to provide an extended travel of the table between the cutter and the said means permitting inspecting of the contoured piece.

15. A machine for contouring work pieces comprising a chain conveyor, a cutter opposing the upper surface of the lower run of the conveyor, tables carried by the conveyor having gripping devices for securing thereto work pieces to be traversed past the cutter and means adjacent the feeding-in end of the machine at the upper run of the conveyor operating on the gripping devices for opening the same to discharge the work pieces from the tables.

16. A machine for contouring work pieces comprising a chain conveyor, a cutter opposing the upper surface of the lower run of the conveyor, tables pivotally hung on the conveyor, means in the vicinity of the cutter on which the tables ride to be supported thereby during the cutting operation, the tables having gripping devices for securing thereto work pieces to be traversed past the cutter and means adjacent the feeding-in end of the machine at the upper run of the conveyor operating on the gripping devices for opening the same to discharge the work pieces from the tables.

17. A machine for contouring work pieces comprising a conveyor, a cutter opposing a run of the conveyor, tables carried by the conveyor for carrying work pieces past the cutter, a second conveyor having a run moving at the same surface speed and adjacent said run of the first conveyor and having back stops for the work pieces, which by virtue of the coordinated positions of the tables and back stops on the conveyors respectively are moved in over the back ends of the tables at the inlet ends of said runs.

18. A machine for contouring work pieces comprising a conveyor, a cutter opposing a run of the conveyor, tables carried by the conveyor for carrying work pieces past the cutter, a second conveyor having a run moving at the same surface speed and adjacent said run of the first conveyor and having back stops for the work pieces which are moved in over the back ends of the tables at the inlet ends of said runs, and means for adjusting the phase of said conveyors to determine the position which each back stop takes relatively to its table.

LEO J. LAMBERT.

REFERENCES CITED

The following references are of record in the file of this patent:

UNITED STATES PATENTS

| Number | Name | Date |
|---|---|---|
| 385,125 | Lee | June 26, 1888 |
| 406,225 | Metz | July 2, 1889 |
| 494,771 | Austin | Apr. 4, 1893 |
| 769,980 | Borg | Sept. 13, 1904 |
| 885,292 | Richards | Apr. 21, 1908 |
| 1,069,995 | Anderson | Aug. 12, 1913 |
| 1,551,178 | Strand | Aug. 25, 1925 |
| 1,615,088 | Klieber | Jan. 18, 1927 |
| 1,862,898 | Knight | June 14, 1932 |
| 1,863,251 | Person | June 14, 1932 |
| 1,908,029 | Larson | May 9, 1933 |
| 2,088,119 | Schiltz | July 27, 1937 |
| 2,361,820 | Cromwell | Oct. 31, 1944 |